Feb. 15, 1938. J. V. CRICHTON 2,108,401
WHEEL BRAKE MECHANISM
Filed Oct. 8, 1936   3 Sheets-Sheet 3
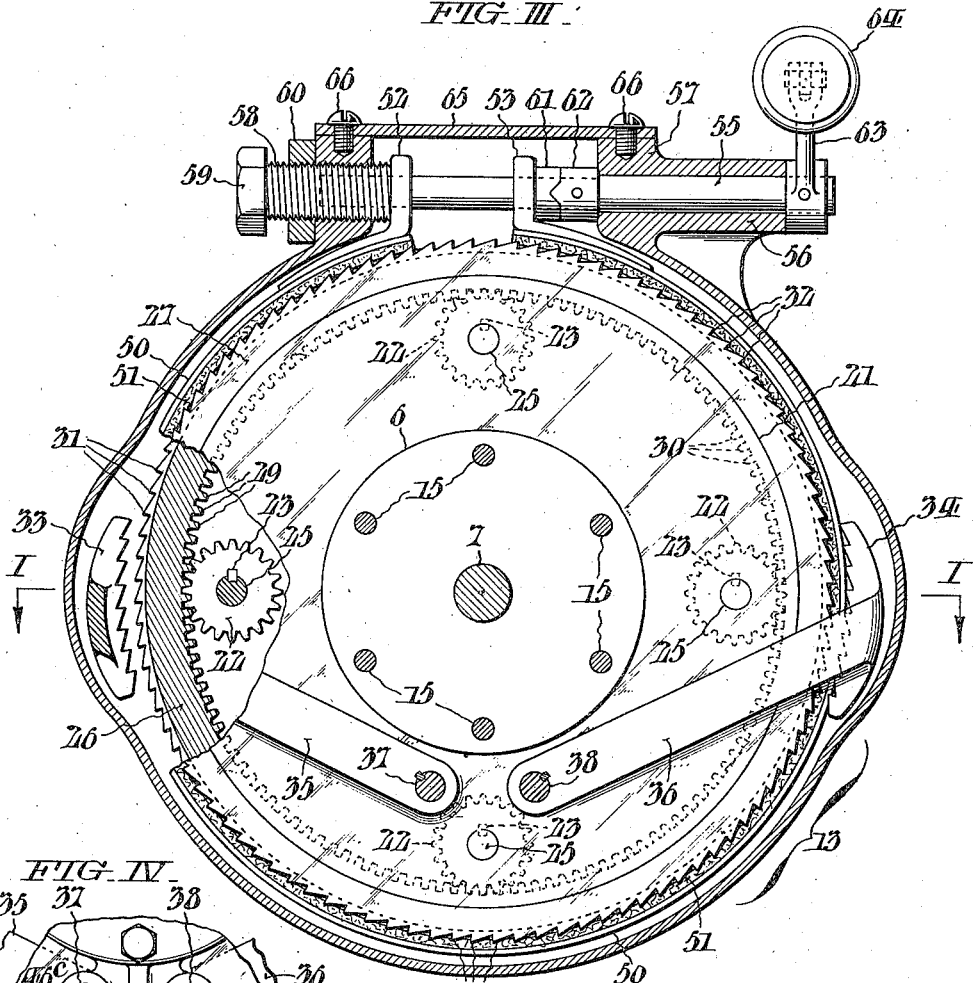
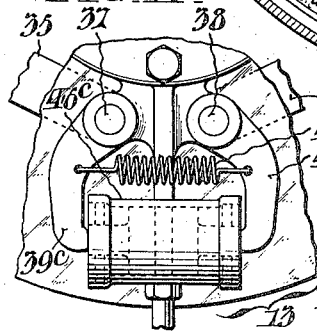
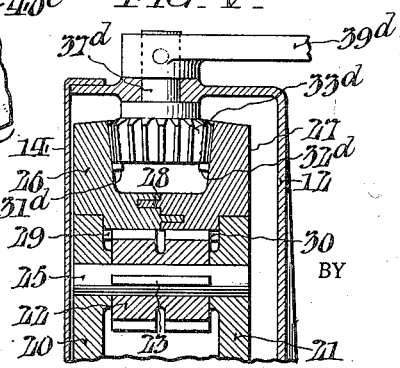
INVENTOR:
James V. Crichton,
BY
ATTORNEYS.

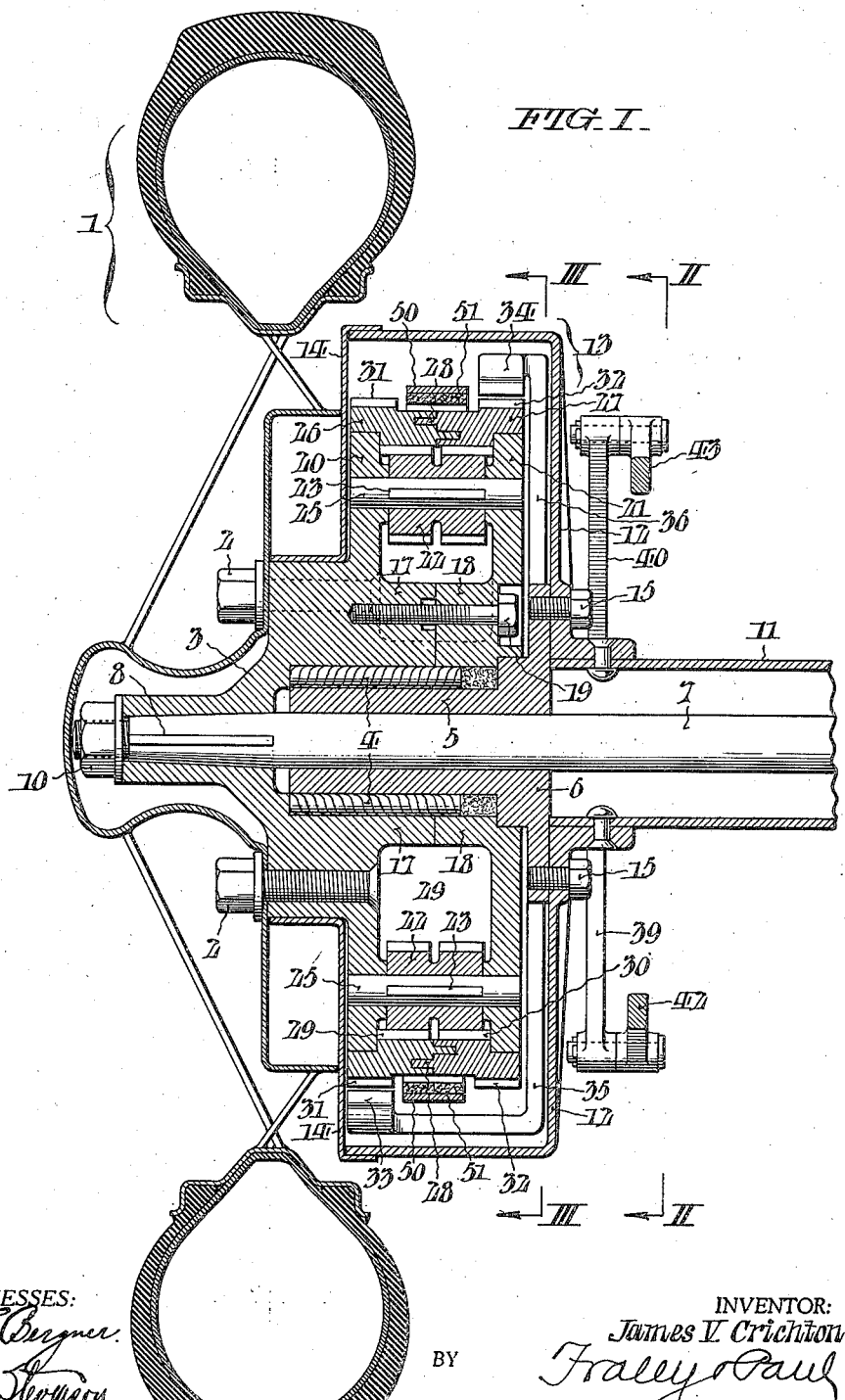
FIG. I.

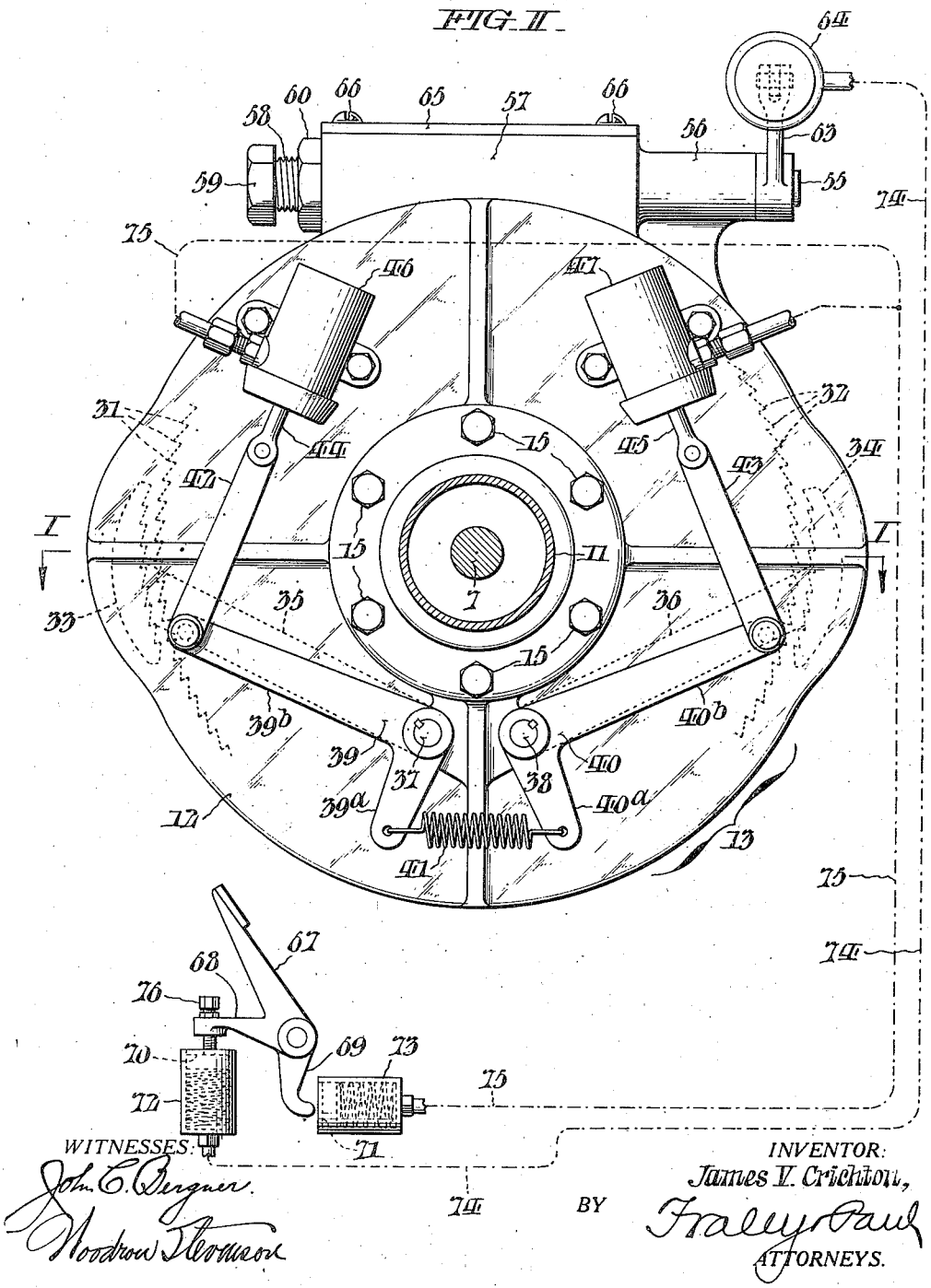

Patented Feb. 15, 1938

2,108,401

UNITED STATES PATENT OFFICE 2,108,401

WHEEL BRAKE MECHANISM

James V. Crichton, Philadelphia, Pa., assignor of one-half to Karl Salberg, Philadelphia, Pa.

Application October 8, 1936, Serial No. 104,602

9 Claims. (Cl. 188—152)

This invention relates to wheel brakes useful in connection with automobiles and other vehicles, elevators and other machinery where quick and effective wheel stoppage is desired or necessary.

The chief aim of my invention is to make it possible to utilize toothed gearing in securing effective wheel brake action with exertion of a minimum of manual effort. This desideratum I realize in practice, as hereinafter more fully explained, through provision of a simple and reliable brake mechanism wherein a planetary gear unit, including a series of circumferentially-arranged gear pinions on a hub member to which the wheel is secured and a pair of contiguously-placed intermeshing gear elements concentric with the wheel axis, bodily rotates with the wheel normally; and wherein, when the brake is to be applied, the two gear elements are first stopped from rotating with the intermeshing pinions rolling around them, and then subjected to rotational torsion in opposite directions to restrain and finally check rotation of the pinions.

Other objects and attendant advantages will appear from the following detailed description of the attached drawings, wherein Fig. I shows, in axial section, one of the drive wheels of an automobile embodying my improved mechanism, viewed as indicated by the arrows I—I in Figs. II and III.

Fig. II is a detail sectional view taken as indicated by the arrows II—II in Fig. I, with the control means for the brake mechanism diagrammatically shown.

Fig. III is a detail sectional view taken as indicated by the arrows III—III in Fig. I.

Fig. IV is a fragmentary view corresponding to Fig. II, showing a modified detail; and Fig. V is a fragmentary sectional view corresponding to Fig. I showing an alternative embodiment of my invention.

With more specific reference first to Figs. I–III of these illustrations, the wheel designated comprehensively by the numeral 1 is of well known construction and removably secured by bolts 2 to a hub member 3. As shown, the hub member 3 is mounted to revolve freely, with interposition of anti-friction rollers 4, about the axial boss 5 of a central bearing member 6 through which the section 7 of the drive shaft of the automobile extends, said hub member being keyed as at 8 to the outer tapered end of said shaft section 7 and secured by a retaining nut 10 after more or less common practice. To the tubular housing 11 surrounding the shaft section 7 is riveted the half component 12 of a coaxial cylindrical oil-tight casing 13 which encloses the planetary gearing and other parts of the brake mechanism, the other half of said casing being indicated at 14. As shown in Fig. I, the bearing member 5 is secured to the casing component 12 by screw bolts 15.

The wheel hub member 3, it will be noted, consists of two separable sections 17 and 18 which are rigidly connected by a plurality of screw bolts, whereof one is indicated at 19 in Fig. I, and which are respectively formed with integral concentric disk flanges 20, 21. In the interval between the disk flanges 20, 21 is a circumferentially-arranged series of spur pinions 22 which are keyed as at 23 to individual shafts 25 journaled for independent rotation in bearing apertures afforded by said flanges. Mounted with capacity for independent rotation about the peripheries of the disk flanges 20, 21 are a pair of contiguously placed rings 26, 27 which meet in a multiple annular lap tongue and groove sealing juncture 28 designed to prevent escape of lubricating grease from within the hollow 29 of the hub member 5. Internally, the rings 26, 27 are respectively provided with gear teeth 29, 30 for meshing engagement with the several pinions 22, and externally, with oppositely-faced ratchet teeth 31, 32 which are adapted to be engaged respectively by pawl elements 33 and 34 having correspondingly faced teeth for a purpose later on explained. As shown in Figs. I and III, the pawl elements 33, 34 are respectively supported by arms 35, 36 affixed to shafts 37, 38 which extend outward through suitable bearing apertures in the casing component 12. To the protruding ends of the shafts 37, 38, see Fig. II, are affixed bell cranks 39, 40. A spring 41 connecting the arms 39a, 40a of the bell cranks 39, 40 serves to keep the pawl members 33, 34 normally retracted clear of the ratchet teeth 31 and 32 on the two gear rings 26 and 27. The longer arms 39b, 40b of the bell cranks 39, 40 are coupled, by means of links 42, and 43 respectively, with the piston rods 44, 45 of hydraulic actuating cylinders 46, 47 bolted fast to the back of the casing component 12.

Surrounding the gear rings 26, 27 in the interval between their ratchet teeth 31, 32 is a contractible brake band 50 with a renewable lining 51, said brake band being split and having upwardly extending ear lugs 52, and 53 secured to its ends, which lugs, it will be noted from Fig. III, are apertured for passage of an actuating shaft 55. At one end, the shaft 55 has journaled support in a boss 56 on an upward extension 57 of the casing component 12, and at its other end within the hollow of a bearing sleeve 58 which is threadedly engaged in the upward extension of the casing, and which forms an adjustable abutment for the ear 52 on the brake band. At its outer end, the sleeve 58 is provided with a polygonal head 59 which permits the use of a wrench in adjusting it; and associated with the sleeve is a jam nut 60 for fixing it in adjusted positions. The ear 53 of the brake band 50 has an integrally-formed cam boss 61 which is adapted to react with a cam collar 62 pinned to the actuating shaft 55 within the upward extension 57 of the casing 13, the cam surfaces of said boss and said collar being maintained in engagement by the inherent springiness of the brake band. To the outer end of the shaft 55 beyond the bearing 56 is secured an arm 63 arranged to be operated by a fluid actuated cylinder 64. Access may be had to the interior of the casing 13 upon removal of a cover 65 secured by screws 66 over the opening at the top of the upward projection 57 of the casing component 12.

The control means for the brake mechanism may be as diagrammatically shown in Fig. II, comprising a pedal lever 67 with a pair of arms 68, 69 for respectively actuating the pistons 70, 71 of master hydraulic cylinders 72, 73 whereof the first is connected by a pipe 74 with the brake band operating cylinders 64 and the second by a branched pipe 75 with the two pawl actuating cylinders 46 and 47. As will be presently apparent, it is essential to the proper operation of the brake mechanism that the brake band 50 be actuated prior to engagement of the gear rings 26, 27 by the pawl members 33, 34. The arms 68 and 69 of the pedal lever 67 are accordingly so spaced angularly that the piston 70 of the master cylinder 72 is operated somewhat ahead of the piston 71 of the master cylinder 73. In order that the proper period of delay may be accurately determined, the arm 68 of the pedal lever 67 is provided with an adjustable stud screw 76 which directly engages the piston 70 of the master cylinder 72.

The operation of the brake mechanism is as follows: Normally, with the pawl members 33 and 34 retracted and the brake band 50 relaxed, the planetary gearing including the rings 26, 27 and the pinions 22, revolves bodily as a unit with the wheel 1. Upon depression of the foot pedal lever 67, the piston 70 of the master cylinder 72 is first operated, with attendant actuation, in turn, of the cylinder 64 and contraction of the brake band 50 to stop and hold the two gear rings 26, 27 against rotation so that the pinions 22 are obliged to roll around them. As the control pedal 67 is further depressed and the piston 71 of the master cylinder 73 actuated, pressure fluid is forced into the cylinders 46, 47 with the result that the pawl members 33, 34 are moved into engagement with the ratchet teeth 31, 32 on the rings 26, 27, and impart rotary torsional strain in opposite directions, to said rings. A binding action is thus induced between the gear teeth of the rings 26, 27 and the pinions 22 by which the wheel 1 is quickly decelerated and finally stopped altogether, the rate of retardation being directly proportional to the pressure exerted upon the control pedal 67.

In practice, the band 50 is adjusted that the pressure exerted upon the rings 26, 27 is relatively light—just sufficient to prevent them from rotating—so that said rings can be influenced by the pawl members 33, 34 in the manner described.

In the alternative embodiment of my invention shown in Fig. IV, a single double-acting hydraulic cylinder 46c with two pistons is employed instead of two separate cylinders to actuate the pawl members 33 and 34. Moreover, in the modification, in lieu of bell cranks, arms 39c and 40c are secured to the shafts 37 and 38 to which the arms 35 and 36 of the pawl members are attached. As shown, the arms 39c, 40c bear upon the ends of the pistons in the hydraulic cylinder 46c; and a spring 41c connecting said arms tends to keep the pawl members normally out of engagement with the ratchet teeth of the two gear rings.

In the alternative embodiment of my invention illustrated in Fig. V, a brake band is dispensed with, and the rings 26, 27 provided with bevel gear teeth 31d, 32d instead of ratchet teeth. Meshing with the bevel gear teeth 31d, 32d is a bevel pinion 33d on a shaft 37d which extends through a bearing boss on a casing component 12 and to which is secured at the outer end, an actuating arm 39d. As a result of this alternative arrangement, the rings 26 and 27 are normally held stationary by the bevel pinion 33d with the spur pinions 22 rolling on the internal gear teeth 29, 30 of said rings. Brake application is here effected by slight turning of the actuating lever 39d in one direction or the other, with resultant impartation of rotative torsion in opposite directions to the gear rings 26, 27 as in the first described embodiment of my invention.

While, for the purposes of exemplification I have shown and described my invention in association with a vehicle wheel, it can obviously be employed in other connections with attainment of advantages equal in all respects to those pointed out hereinbefore.

Having thus described my invention, I claim:

1. Wheel brake mechanism comprising a plurality of rotatably-free gear pinions circumferentially arranged about the wheel axis and carried by the wheel; a pair of independently supported juxtaposed toothed gear elements concentric with the wheel axis and meshing with the several pinions; and means operative to exert rotary torque in opposite directions upon the two gear elements in effecting the wheel braking.

2. Wheel brake mechanism comprising a plurality of gear pinions circumferentially arranged about the wheel axis; a hub member on the wheel supporting the pinions with capacity for independent rotation; a pair of juxtaposed toothed gear elements concentric with the wheel axis and meshing with the several pinions, said gear elements being normally free to revolve with the wheel; and control means operative to first stop and hold the gear elements from rotating and to thereafter, with the pinions rolling around said gear elements, to exert rotary torsion in opposite directions upon the latter.

3. Wheel brake mechanism according to claim 1, wherein the intermeshing pinions and gear elements are enclosed in an oil-tight casing, and the gear elements controlled by connections extending into the interior of the housing.

4. Wheel brake mechanism comprising a plurality of gear pinions circumferentially arranged about the wheel axis; a hub member on the wheel supporting the pinions with capacity for independent rotation; a pair of juxtaposed gear rings concentric with the wheel axis and having internal teeth in mesh with the several pinions, said rings being normally free to revolve with the wheel; and control means operative to first stop and hold the two rings from rotating, and to thereafter, with the pinions rolling on the teeth around said rings, exert rotary torque upon the latter in opposite directions.

5. Wheel brake mechanism comprising a plurality of gear pinions circumferentially arranged about the wheel axis; a hub member on the wheel supporting the pinions with capacity for independent rotation; a pair of juxtaposed rings concentric with the wheel axis and having internal teeth in mesh with the several pinions, said rings being normally free to revolve with the wheel; a brake band common to the two gear rings; and control means operative to first contract the brake band and to thereby stop the two rings from rotating, and to thereafter, with the pinions rolling around the teeth of said rings, exert rotary torque upon the latter in opposite directions.

6. Wheel brake mechanism comprising a plurality of gear pinions circumferentially arranged about the wheel axis; a hub member on the wheel supporting the pinions with capacity for independent rotation; a pair of juxtaposed rings concentric with the wheel axis and having internal teeth in mesh with the several pinions, said rings being normally free to revolve with the wheel; and also having oppositely-faced external ratchet teeth respectively; normally retracted pawl members respectively associated with said rings; and control means operative to first stop and hold the two rings from rotating, and to thereafter, with the pinions rolling around the gear teeth of said rings, move the pawl members concurrently into engagement with the ratchet teeth on the rings and thereby exert rotary torque upon the latter in opposite directions.

7. Wheel brake mechanism comprising a plurality of gear pinions circumferentially arranged about the wheel axis; a hub member on the wheel supporting the pinions with capacity for independent rotation; a pair of juxtaposed rings concentric with the wheel axis and having internal gear teeth in mesh with the several pinions, said rings being normally free to revolve with the wheel and also having oppositely faced external ratchet teeth respectively; an oil-tight casing enclosing the hub member and the rings; pawl members respectively associated with the rings within the casing, said pawl members being secured to shafts extending through the wall of the casing; actuating arms on the protruding ends of said shafts; hydraulic cylinder means for actuating said arms; and control means operative to first stop and hold the two rings from rotating, and to thereafter, with the pinions rolling around the gear teeth of said rings, move the arms aforesaid concurrently to bring the pawl members into engagement with the ratchet teeth on the rings and exert rotary torque upon the latter in opposite directions.

8. Wheel brake mechanism comprising a plurality of gear pinions circumferentially arranged about the wheel axis; a hub member on the wheel supporting the pinions for independent rotation; a pair of juxtapositioned rings concentric with the wheel axis and having internal teeth in mesh with the several pinions, said rings being normally free to revolve with the wheel and also having oppositely faced external ratchet teeth respectively; a brake band common to the two gear rings; normally retracted pawl members respectively associated with the rings; a casing enclosing the wheel hub member, the gear rings, the brake band, and the pawl members; actuating connections for the brake band and for the pawl members extending to the exterior of the casing; and control means operative to first contract the brake band to stop and hold the rings from rotation, and to thereafter, with the pinions rolling around the gear teeth of said rings, actuate the pawl members concurrently to bring them into engagement with the ratchet teeth on the rings and exert rotary torque to the latter in opposite directions.

9. Wheel brake mechanism comprising a plurality of rotatably free gear pinions circumferentially arranged about the wheel axis and carried by the wheel; a pair of independently supported juxtapositioned gear rings concentric with the wheel axis, said rings having internal teeth in mesh with the several pinions, and opposingly arranged external peripheral bevel gear teeth; an intermeshing bevel pinion common to the two rings and preventing their rotation normally; and means whereby the bevel pinion may be actuated to exert rotary torque in opposite directions upon the gear rings in effecting the wheel braking.

JAMES V. CRICHTON.